United States Patent [19]

Meyer

[11] Patent Number: 5,217,291

[45] Date of Patent: Jun. 8, 1993

[54] SPOTLIGHT ASSEMBLY FOR VEHICLES AND METHOD OF INSTALLATION

[75] Inventor: Bruce A. Meyer, Stafford, Tex.

[73] Assignee: Linear Solutions, Inc., Tex.

[21] Appl. No.: 801,412

[22] Filed: Dec. 2, 1991

[51] Int. Cl.⁵ .............................................. B60Q 1/06
[52] U.S. Cl. ....................................... 362/66; 362/421
[58] Field of Search ........................ 362/66, 421, 429

[56] References Cited

U.S. PATENT DOCUMENTS

| | | | |
|---|---|---|---|
| 1,492,682 | 5/1924 | Foster | 362/421 |
| 1,612,960 | 1/1927 | Anderson | 362/66 |
| 4,419,721 | 12/1983 | Gregoire et al. | 362/66 |

FOREIGN PATENT DOCUMENTS

455615 2/1928 Fed. Rep. of Germany ........ 262/66

Primary Examiner—Carroll B. Dority
Attorney, Agent, or Firm—Bush, Moseley & Riddle

[57] ABSTRACT

A spotlight assembly (10) has inner and outer hemispherically shaped mounting members (20, 21) fixed to the roof (R) of a vehicle (A). Inner and outer movable frames (12, 14) are mounted on the fixed mounting members (20, 21) for relative rotative and tilting movements upon actuation of a handle (78). A lamp unit (16) is mounted on outer movable frame (14) about horizontal pivots (90, 91) from linkages (106, 50, 51). The tilting movement of handle (78) results in a tilting movement of lamp unit (16) around three times the angular movement of handle (78) to permit lamp unit (16) to be easily folded to a protected retracted position as shown in FIG. 3. The spotlight assembly (10) is easily installed on the roof (A) by first securing the inner and outer fixed hemispherically shaped mounting members (20, 21) to the roof (R), then mounting an upper movable subassembly on the outer mounting member (20) with an operating shaft (43) extending through the opening in the roof, and next mounting the lower movable subassembly on the inner mounting member (21) with the operating shaft (43) being received in an interfitting telescoping position for actuation by a handle (78).

28 Claims, 6 Drawing Sheets

SPOTLIGHT ASSEMBLY FOR VEHICLES AND METHOD OF INSTALLATION

FIELD OF THE INVENTION

This invention relates to a spotlight assembly for vehicles and method of installation, and more particularly to such a spotlight assembly including a lamp unit having a low profile particularly if the spotlight is not in use.

BACKGROUND OF THE INVENTION

Heretofore, spotlights have been mounted on vehicles, such as police cars and other emergency vehicles. Various types of mounting means have been used heretofore, such as a mounting member extending from the front corner post of the vehicle body. It is desirable to have a minimal projecting height from the top or roof of the vehicles as damage may occur from various sources, such as low overhead structures, for example.

My prior U.S. Pat. No. 4,725,238 dated Feb. 16, 1988, shows a bracket for mounting a spotlight on the roof of a car with manual means on the inside of the roof for controlling the positioning of the spotlight. The lamp or spotlight unit is secured to the movable outer frame or socket assembly for movement therewith and is not mounted for any movement relative to the outer socket assembly. Thus, the lamp or spotlight unit is limited in its tilting movement to a total movement of around 45 degrees and may not be moved to a retracted position projecting a minimal height or distance from the roof of the vehicle so that it may be protected by the socket assembly.

SUMMARY OF THE INVENTION

The present invention is directed to a spotlight assembly especially adapted for mounting on the roof of a vehicle, such as a police car or emergency vehicle, for example, and having a lamp or spotlight unit adapted to be selectively moveable between a retracted position with the spotlight facing generally in a vertical direction and a predetermined projected position with the lamp unit being positioned to project a light beam in a desired direction including a downward direction with as much as a 30 degree declination. In the retracted position of the lamp unit, the spotlight projects a minimal height or distance above the roof of the vehicle and is protected by fairing or shrouding in a forward direction.

It is necessary to mount the spotlight unit for both a tilting movement and a rotating movement. The mounting means includes a fixed hemispherically shaped mounting member on inner and outer sides of the roof, and a movable frame having a concave socket member fitting over each of the fixed hemispherically shaped mounting members. The lamp unit is mounted on the movable outer frame and linkage between the lamp unit and movable outer frame permits rotation of the lamp unit with the movable outer frame and permits tilting of the lamp unit in a vertical plane. The linkage permits a relatively small movement of the actuating handle in a vertical plane to result in a relatively large movement of the spotlight unit in a vertical plane thereby to permit the lamp unit to be easily moved to a retracted position closely adjacent the roof of the vehicle. A lever actuated cam mechanism on the handle sets the drag in the ball and socket assembly to effectively "lock" the unit in any position the user desires. A depressible button on the handle permits the user to easily "unlock" the unit for free movement.

It is an object of this invention to provide such a spotlight assembly having a lamp unit mounted for unlimited rotation and for tilting movement in a vertical plane with a relatively small movement of an actuating handle resulting in a relatively large movement of the lamp unit in a vertical plane.

Another object is the provision of a translucent glare control fairing to protect the lamp unit when in a retracted position and to reduce glare when the lamp unit is in a projected position by filtering a low portion of the beam.

It is a further object of this invention to provide a spotlight assembly including a lamp unit for mounting on the roof of a vehicle with the lamp unit having a minimal projecting height from the roof particularly in an inoperable position of the spotlight assembly.

It is another object of this invention to provide a mounting assembly for mounting a lamp unit or the like on the roof of a vehicle with the spotlight assembly being controlled by actuating means inside the vehicle movable between locked and unlocked positions.

An additional object is to provide a method of installing a spotlight assembly on the roof of a vehicle in a simple and quick manner.

DESCRIPTION OF THE INVENTION

Figure 1:
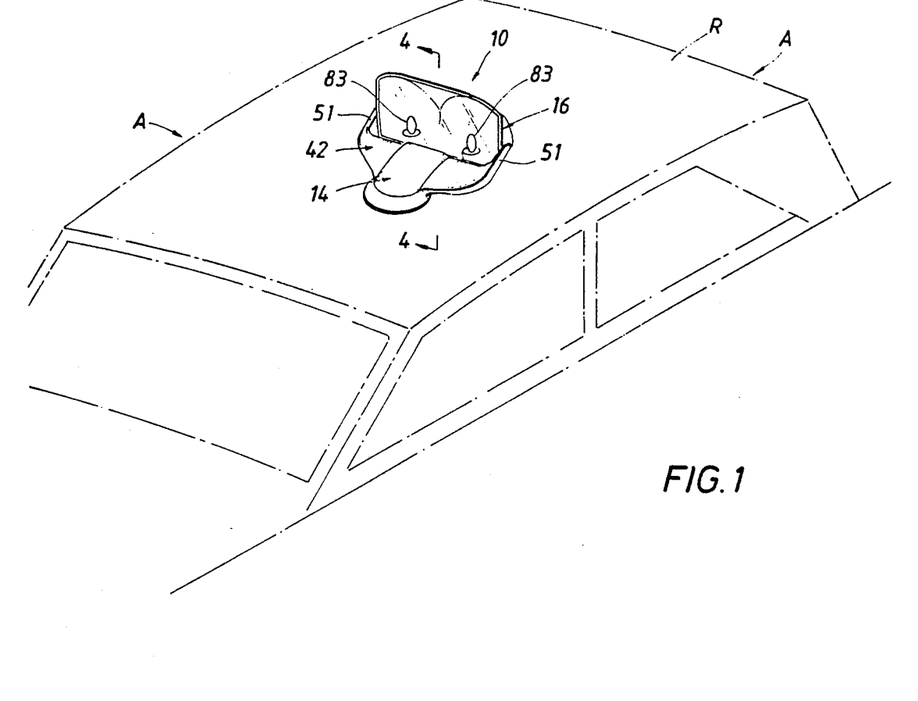
FIG. 1 is a perspective of the spotlight assembly comprising the present invention shown mounted on the roof of an automobile, such as a police vehicle for example.
Figure 2:
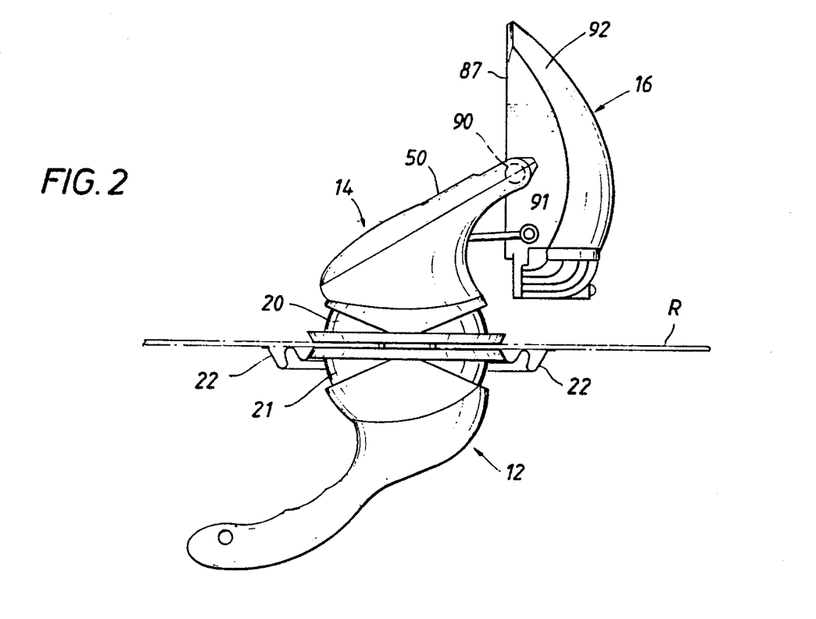
FIG. 2 is an enlarged side elevation of the spotlight assembly of FIG. 1 with the lamp unit in a projected operable position.

Referring to the drawings for a better understanding of this invention, and more particularly to FIGS. 1 and 2, an automobile is shown A having a roof R on which a spotlight assembly generally indicated at 10 and comprising the present invention is mounted. Spotlight assembly 10 includes an inner movable frame generally designated 12 on the inner side of roof R and an outer movable frame 14 on the upper or outer side of roof R. A spotlight unit or lamp unit generally indicated at 16 is mounted on outer movable frame 14 for tilting and rotative movements as will be explained further.

As shown more particularly in FIGS. 4-9, fixed hemispheres or hemispherical shaped mounting sections are shown generally at 20 and 21 having central collar bores 32, internal flanges 33, external flanges 34, and internal flange bores 35. Press fit insert studs 24 extend through flange 33 of hemisphere 20, through receiving holes in roof R, and through flange 33 of hemisphere 21 for securing hemispheres 20, 21 to roof R. An elastomeric retaining ring 25 attached to flange 33 of hemisphere 21 in frictional contact with insert studs 24 retains hemisphere 21 with trim boot 22 during installation without fasteners. Elastomeric trim boot 22 adapts to a range of depths between the underside of roof R and internal headliners for the roof. An intermediate adhesive gasket 23 sandwiched between hemisphere 20 and roof R serves the dual purpose of a weather seal and a retainer for hemisphere 20 during installation.

Figure 4:
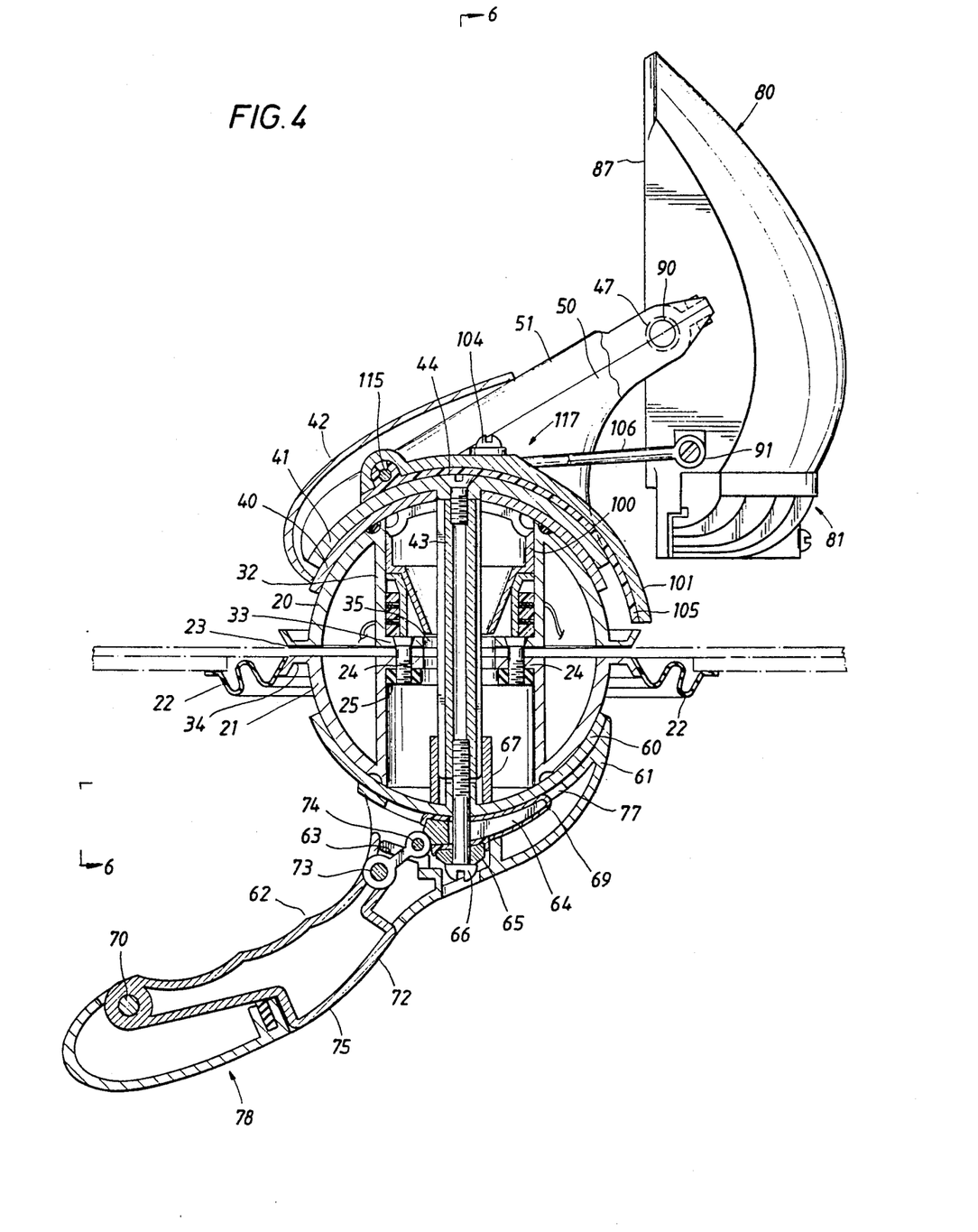
FIG. 4 is an enlarged cross sectional view of the spotlight assembly taken generally along line 4—4 of FIG. 1 and showing the fixed hemisphere members and movable frames thereon mounting the spotlight unit for tilting and rotative movements with the lamp unit shown in an operable projected position.
Figure 5:
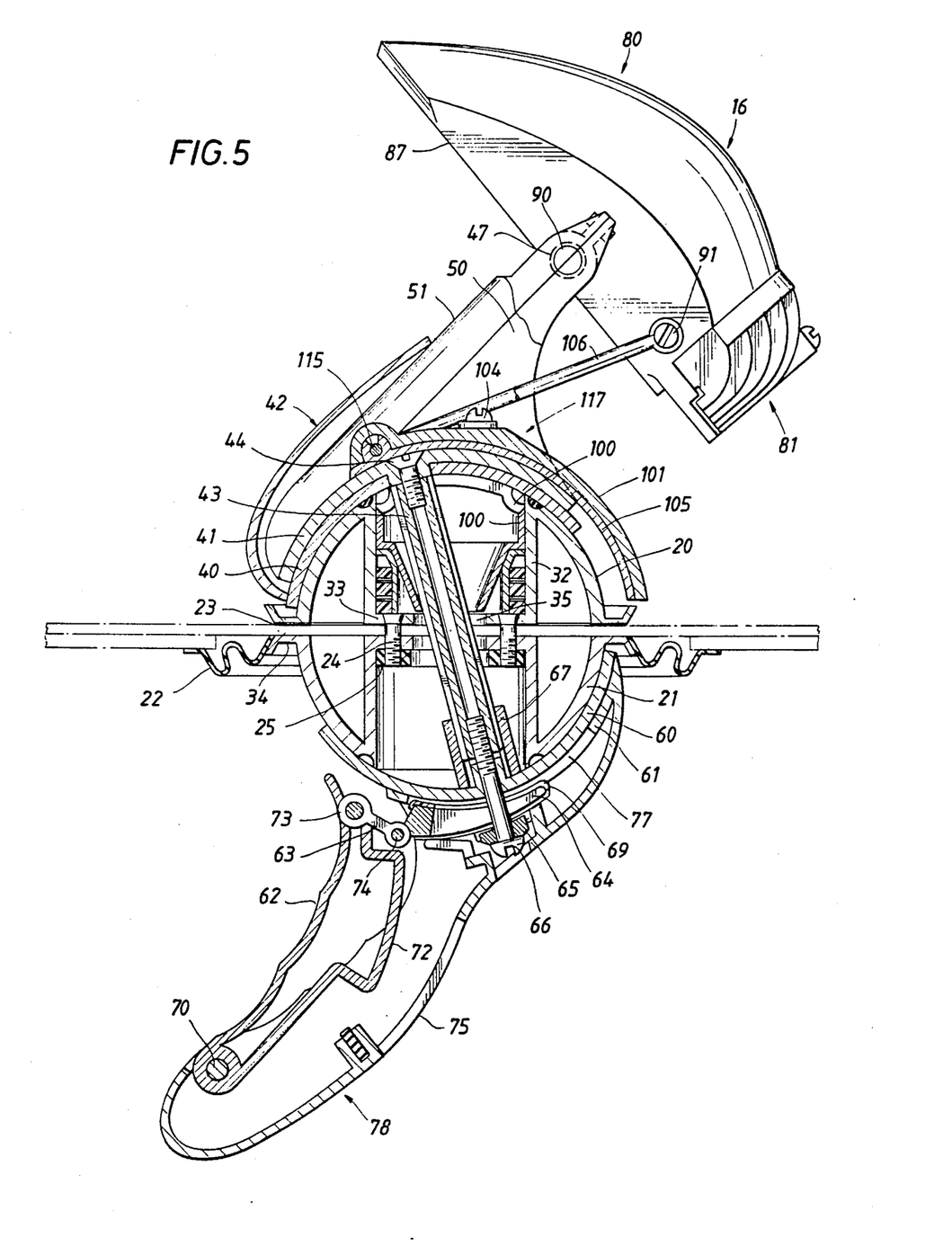
FIG. 5 is an enlarged cross sectional view similar to FIG. 4 but showing the lamp unit tilted downwardly in a vertical plane from the position of FIG. 4.

Mounted for rotative and tilting movements on fixed hemispherical mounting sections or members 20 and 21 are the outer movable frame 14 on the outer side of roof R and the inner movable frame 12 on the inner side of roof R. Outer movable frame 14 is generally comprised of upper frame member 41, upper concave polymer shell 40, translucent fairing 42, and control shaft or rod 43. Frames 12 and 14 are connected to each other by a splined shaft or rod 43 extending through internal flange bores 35 of hemispherical sections 20 and 21. Outer movable frame 14 includes a lower tilting section having an intermediate concave polymer shell 40 forming a socket in frictional contact relation with fixed hemisphere 20 and similar outer concave frame section of member 41. Threaded fastener 44 secures splined shaft 43 to frame member 41 for movement therewith.

The translucent fairing or housing member 42 formed of a plastic material such as a polycarbonate material, for example, is secured to and extends in a rearward direction in conjunction with frame member 41 and has a pair of side arms or extensions 51 also mated with frame extensions 50. Frame and fairing extensions 50 and 51 clamp together to provide seats for bearings 47 at opposing ends of each extension. Bearings 47 connect to pivots 90 of lamp unit 16 to permit pivoting of lamp unit 16 about a horizontal axis. Fairing member 42 acts to protect lamp unit 16 particularly in the retracted position shown in FIG. 3 from flying debris or the like from a position forwardly of vehicle A. Fairing member 42 fits in close proximity with lamp unit 16 when in the retracted position to protect from fouling due to ice or road debris from a position forwardly of vehicle A. Translucent fairing member 42 also serves to filter the lower portion of the spotlight beam thereby reducing glare that might limit the visibility of the driver of vehicle A.

An upper non-tilting frame section over the lower tilting frame section 41 includes an upper concave member 101 and an intermediate concave bearing member 105. An inner thimble or sleeve 100 is mounted for relative rotative movement within bore 32 of hemisphere 20 and receives a pair of female threaded electrical contact lugs 102. Male electrically conductive, threaded fasteners 104 within insulating washers 103 provide a mechanical and electrical union between upper concave member 101 and inner thimble 100 with its electrical contact lugs 102. This assembly is referenced 117. Elongate slots 52 in frame 41 and corresponding elongate slots 53 in concave polymer shell 40 allow upper frame assembly 14 to tilt freely relative to non-tilting assembly 117. Contact between the convex planar surface of frame 41 and concave surfaces of members 101 and 105 assure that assembly 117 is slaved to all rotational movements of upper movable frame 14. Concave bearing 105 and thimble 100 are formed of a high lubricity polymer material to allow sufficient clamping force to be exerted by fasteners 104 to prevent exterior moisture from reaching slots 52 and 53 without incurring excessive drag between the tilting motions of frame member 41 and shell 40 in relation to non-tilting assembly 117.

Concave member 101 and concave bearing member 105 of assembly 117 provide a pivoting bearing seat for linkage member 106 at pivot 115 as illustrated in FIG. 4. Generally U-shaped linkage 106 has opposed ends mounted for pivotal movement at pivots 91 about a horizontal axis on opposed bosses of lamp unit 16. Tilting motion of upper movable frame 14 raises lamp unit 16 about pivots 90 into its operable position. The linkage between non-tilting assembly 117 and pivots 91 on lamp unit 16 effects a mechanical advantage on lamp unit 16 causing it to tilt on pivots 90 at approximately a three to one relationship to the 45 degree tilting action of upper frame member 41. By varying the distance between pivots 90 and pivots 91 on lamp unit 16 the mechanical advantage of the tilt action in lamp unit 16 can be proportionally increased or decreased.

Lamp unit 16 has a pair of halogen bulbs 83 therein adjacent parabolic reflectors 92 and protected by tempered glass lens 87 over the face of lamp unit 16. Suitable halogen bulbs may be purchased as H3-100 bulbs from Osram, Newburgh, N.Y. As shown particularly in FIGS. 8 and 9, bulb 83 is secured to bulb carrier 82 by suitable spring clips (not shown) so that the bulb element 93 is precisely aligned with the axis 94 of parabolic reflector 92. Bulb carrier 82 receives threaded adjusting screw 84 which passes through counteracting spring 85. Manually adjusting the screw moves the bulb element 93 inward or outward along axis 94 to focus the reflected light beams to converge at variable distances. Defocusing the beam serves to disperse the light beams, thereby providing a more generalized flood lighting as may be desired under certain applications. Mounting halogen bulb 83 at a perpendicular attitude to axis 94 serves to align bulb element 93 with axis 94 to optimize the convergence of the light beams. This mounting attitude further allows the implementation of parabolic reflector 92 with a shorter focal length than would otherwise be practical and therefore increasing the efficiency of the optical set to reflect and focus a greater percentage of the emitted light of bulb 83. This mounting attitude further serves to permit such focus travel within a relatively shallow lamp body 80. The integration of reflector and lamp boy in unit 80 serves to further reduce depth and weight in lamp unit 16. The relatively shallow lamp unit 16 is significant to minimizing the retracted profile of the entire upper assembly of frame 14 and lamp unit 16. Lamp module 81 with bulb carriers 82 and bulbs 83 may be separated from lamp body 80 by removing two threaded fasteners for servicing or replacement of bulbs 83.

For tilting and rotating lamp unit 16, lower movable frame 12 comprises a handle assembly 78 which may be manually gripped by an operator of the vehicle A. Handle assembly 78 has an intermediate concave shell 60 between a lower handle frame 61 and fixed hemispherical mounting section 21. Handle assembly 78 is connected to splined shaft 43 by an interfitting splined receiver or socket 67 which receives the splined end of shaft 43 in a telescoping relation. A fastener 66 secures shaft 43 and receiver 67 together for movement with handle assembly 78. Manually depressible lever 62 is mounted at one end of handle frame 61 for relative pivotal movement about pivot axis 70 and has a button 72 thereon for fitting within opening 75 in handle frame 61. The other end of lever 62 is pivotally mounted at 73 to an overcenter link member 63 pivotally mounted at 74 to cam 64 fitting between the convex surface 77 of handle frame 61 and a cam follower 65 about threaded fastener 66. Cam 64 has a bearing surface 69 adjacent convex surface 77 and cam follower 65. In an inoperable locked position shown in FIG. 4, link member 63 is in an overcenter position with pivot 73 being overcenter with respect to pivots 70 and 74 to releasably hold handle 78 in this position. Cam 64 is urged by lever 62 tightly between cam follower 65 with its associated threaded fastener 66 and convex surface 77 to hold convex shells 40 and 60 in tight frictional contact with adjacent fixed hemispherical mounting sections 20 and 21.

Figure 3:
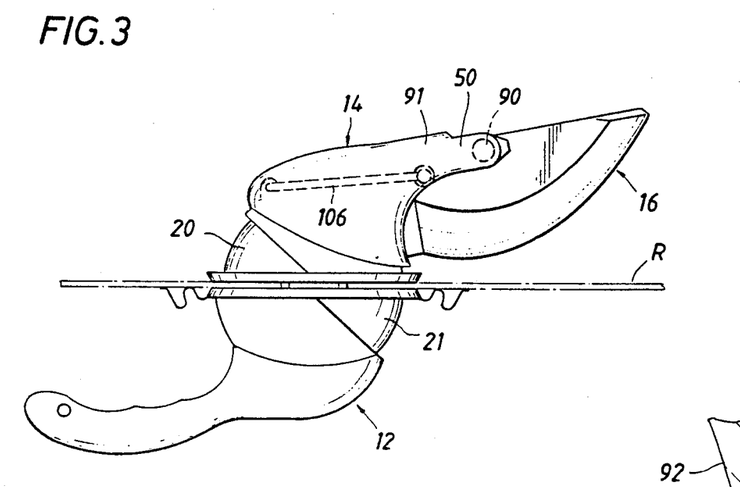
FIG. 3 is an enlarged side elevation similar to FIG. 2 but showing the lamp unit in a retracted position closely adjacent the roof of the vehicle.

When it is desired to tilt or rotate lamp unit 16, button 72 is manually depressed inwardly to move pivot 73 past a dead center relation with respect to pivots 70 and 74 and move cam 64 out of camming relation with cam follower 65 thereby to unlock handle 78 for manual actuation. In this position as illustrated in FIG. 5 handle 78 may be rotated or tilted to impart a corresponding movement to lamp unit 16 since tight frictional contact between fixed hemispherical sections 20, 21 and adjacent concave polymer shells 40, 60 has been released. FIG. 5 shows lamp unit 16 tilted downwardly by handle 78 with members 40 and 41 moving in vertical plane relative to concave member 101 and U-shaped link 106. FIG. 3 shows lamp unit 16 tilted to the rearmost, retracted position to provide a low profile and protect lamp unit 16. FIG. 3 would normally be an inoperable position unless it was desired to direct a beam of light in a generally vertical upward direction. The positioning of pivots 90 and 91 on lamp unit 16 provides a mechanical advantage with the tilting movement of handle 78 in a vertical plane resulting in a tilting movement of lamp unit 16 in a vertical plane around three times the movement of handle 78.

Figure 6:
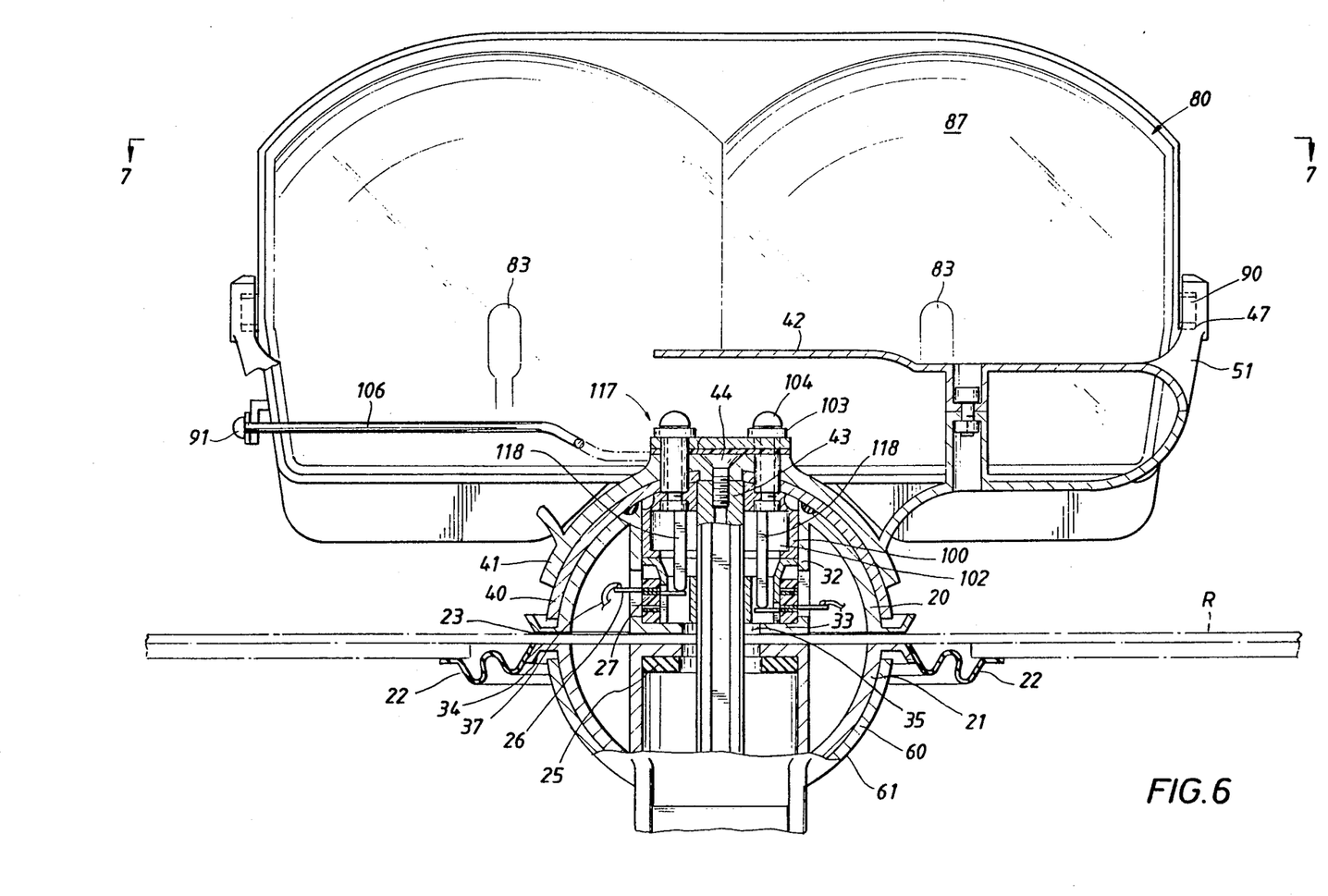
FIG. 6 is an enlarged sectional view taken generally along line 6—6 of FIG. 4.
Figure 7:
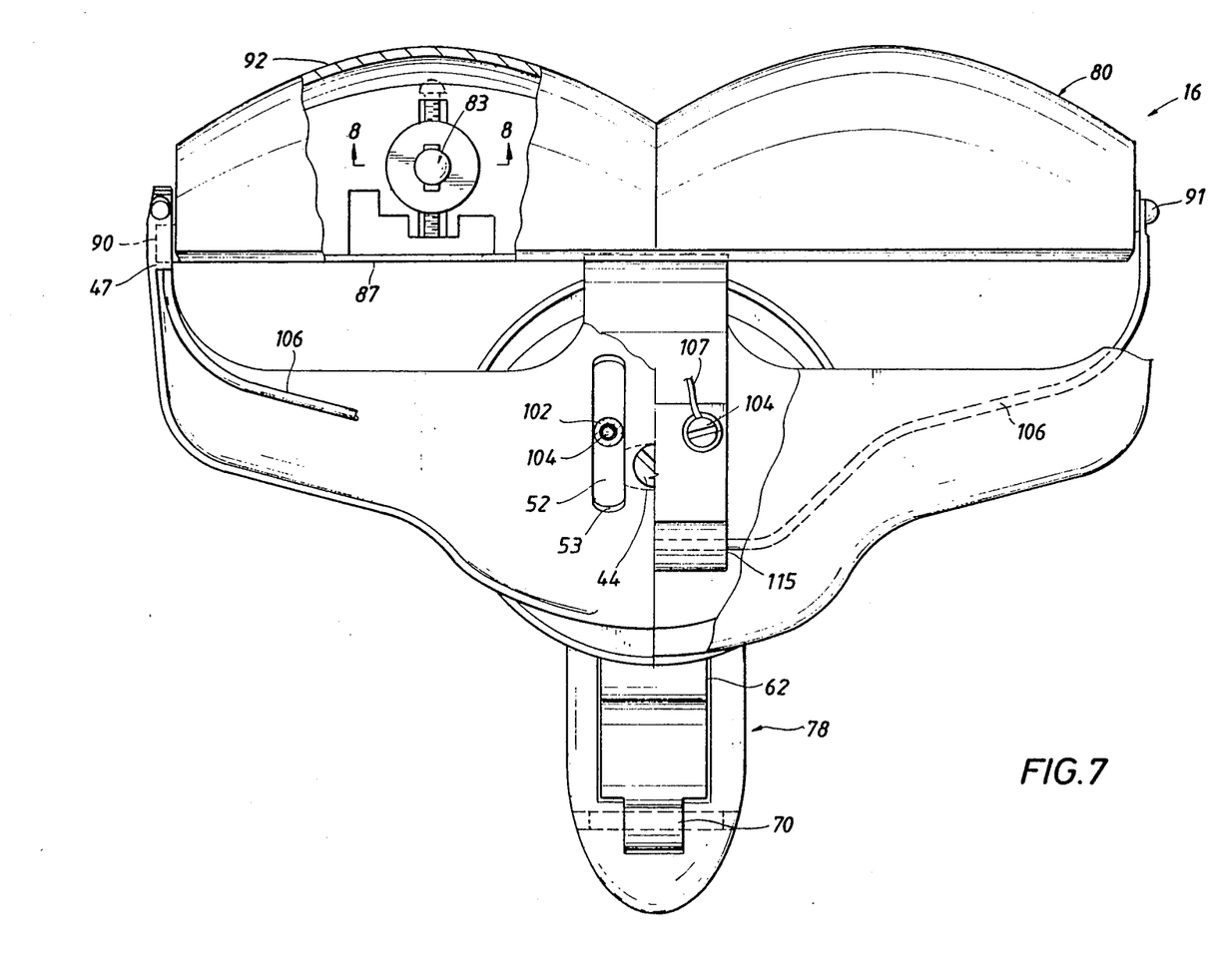
FIG. 7 is a top plan taken generally along line 7—7 of FIG. 6 with certain portions broken away.
Figure 8:
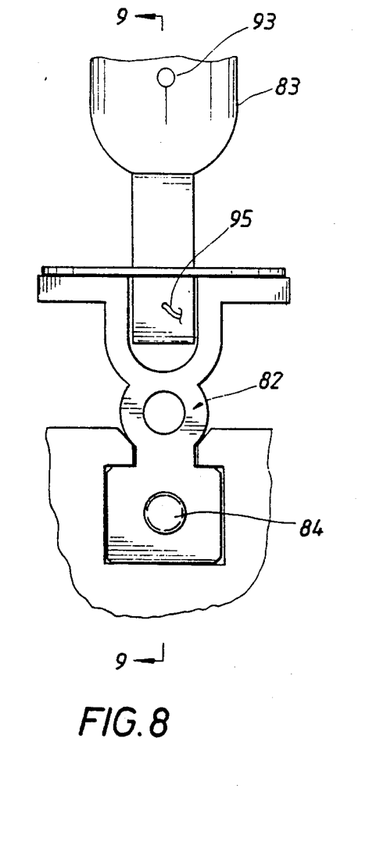
FIG. 8 is a section taken generally along line 8—8 of FIG. 7.
Figure 9:
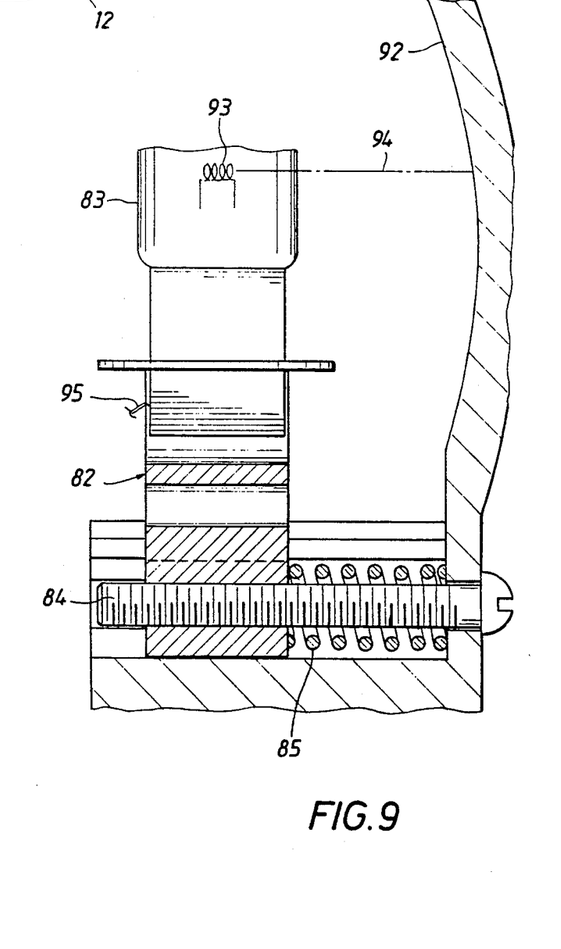
FIG. 9 is a section taken generally along line 9—9 of FIG. 8.

To provide electrical energy to bulbs 83, a pair of electrical leads or wires 37 from a source of electrical energy in automobile A are connected to fixed rings 26 as shown in FIG. 6. Associated contacting, rotatable rings 27 are in contact with respective conducting probes 118 of electrical contact lugs 102 and conducting threaded fasteners 104. Leads 107 from conducting threaded fasteners 104 extend to female quick connect terminals in lamp module 81 and a grounding point in same. Electrical energy is conducted from female quick connect terminal to male terminal on the lead 95 from bulb 83. Bulb 83 is grounded to bulb carrier 82, focus adjusting fastener 84, spring 85, and thereto lamp module 81.

The installation of general spotlight assembly 10 on vehicle A may be accomplished by drilling appropriate holes in roof R corresponding to internal flange bore 35, insert studs 24, and lead wires 37. With bundled lead wires 37 and insert studs 24 extending through their respective holes in roof R, adhesive gasket 23 retains upper hemisphere 20. Lower hemisphere 21 with trim boot 20 is subsequently pressed on insert studs 24 from the underside of roof R and held in place by frictional contact with insert studs 24 and retainer 25. Factory assembled upper frame 14 with lamp unit 16 can be then installed with splined shaft 43 extending through internal flange bore 35 and electrical probes 118 being aligned and contacting rotatable rings 27. The handle assembly 78 is mated with externally splined shaft 43 being inserted within internally splined shaft receiver 67 and retained by threaded fastener 66. The removal of threaded fastener 66 allows the entire spotlight assembly to be rapidly removed from vehicle A for servicing or transfer to another vehicle if necessary without the removal of any other threaded fasteners.

By forming fixed hemispherical mounting sections 20, 21 and concave shells 40, 60 of a high lubricity polymer material such as a glass filled nylon material, the requirement for lubricants is eliminated and a waterproof non-icing service life is provided.

While a preferred embodiment of the present invention has been illustrated in detail, it is apparent that modifications and adaptations of the preferred embodiment will occur to those skilled in the art. Specifically, such functions as bulb focus, variable tension locking, and free rotating electrical conduction could be selectively eliminated in the development of lower cost commercial embodiments. Conversely, the herein described manual bulb focusing could be automated for remote, electrical control by the user within vehicle A. Also, lamp unit 16 may have utility with other types of spotlight assemblies, such as being mounted on a vehicle utility body or the like and actuated without utilizing a lower handle assembly. However, it is to be expressly understood that such modifications and adaptations are within the spirit and scope of the present invention as set forth in the following claims.

What is claimed is:

1. A hand operated spotlight assembly adapted to be mounted on the roof of a vehicle for directing a light beam in a desired direction; said spotlight assembly comprising:

a pair of fixed mounting members secured to opposed sides of the roof in opposed relation to each other to define inner and outer fixed mounting members with the roof having an opening therethrough between the mounting members;

a movable inner frame mounted on said inner fixed mounting member and having a manually actuated handle thereon;

a movable outer frame mounted on said outer fixed mounting member for relative tilting movement and for rotation;

a lamp unit for said movable outer frame;

means mounting said lamp unit on said movable outer frame for relative pivotal movement; and     means extending between and connecting said inner and outer movable frames through said opening in said roof and operatively connected to said handle for movement thereof.

2. A hand operated spotlight assembly adapted to be mounted on the roof of a vehicle for directing a light beam in a desired direction; said spotlight assembly comprising:

inner and outer fixed hemispherically shaped mounting members adapted to be secured to opposed sides of the roof and having a central bore therethrough;

a movable inner frame mounted on said inner fixed mounting member and a movable outer frame mounted on said outer fixed mounting member;

a lamp unit positioned adjacent said movable outer frame;

a sleeve mounted within said central bore of said outer fixed mounting member for selective rotative movement;

a pair of fasteners mounted on said sleeve;

means extending between said fasteners and said lamp unit mounting said lamp unit for pivotal movement about a horizontal axis;

a handle operatively connected to said movable inner frame; and connecting means extending between said inner and outer movable frames through said central bores in said mounting members to effect predetermined movement of said inner and outer movable frames upon manual actuation of said handle.

3. A hand operated spotlight assembly as set forth in claim 2 wherein said pair of fasteners comprises electrical contacts for said lamp unit.

4. A hand operated spotlight assembly adapted to be mounted on the roof of a vehicle for directing a light beam in a desired direction; said spotlight assembly comprising:

inner and outer hemispherically shaped mounting members adapted to be secured to opposed sides of the roof and having a central bore therethrough;

a movable inner frame mounted on said inner fixed mounting member and a movable outer frame mounted on said outer fixed mounting member;

a lamp unit positioned adjacent said movable outer frame;

linkage means between said lamp unit and said movable outer frame mounting said lamp unit for relative pivotal movement in a vertical plane and permitting said lamp unit to move in a vertical plane between a retracted low profile position closely adjacent the roof of the vehicle with the light beam directly generally vertically upwardly to a projected position in which the light beam is directed in a generally horizontal direction;

a handle operatively connected to said movable inner frame; and connecting means extending between said inner and outer movable frames through said central bores in said mounting members to effect a predetermined movement of said outer movable frame and lamp unit upon manual actuation of said handle.

5. A hand operated spotlight assembly as set forth in claim 4 wherein a fairing is mounted on said movable frame forwardly of the lamp unit and extending at a height generally the same as the projecting height of the light unit when in a retracted position thereby providing a protecting shield for the lamp unit from a forward position.

6. A hand operated spotlight assembly as set forth in claim 5 wherein said fairing is formed of a translucent material and filters a low portion of the light beam from the lamp unit in a projected position of the lamp unit.

7. A hand operated spotlight assembly as set forth in claim 4 wherein a pair of bulbs are mounted in said lamp unit; and mounting means for said bulbs permit movement and adjustment of said bulbs along a longitudinal axis to permit focusing of said bulbs.

8. A hand operated spotlight assembly adapted to be mounted on the roof of a vehicle for directing a light beam in a desired direction; said spotlight assembly comprising:

inner and outer fixed hemispherically shaped mounting members adapted to be secured to opposed sides of the roof and having a central bore therethrough;

a movable inner frame mounted on said inner fixed mounting member and a movable outer frame mounted on said outer fixed mounting member;

a lamp unit positioned adjacent said movable outer frame;

means mounting said lamp unit on said movable outer frame for rotative movement with said outer frame and permitting tilting movement of said movable outer frame relative to said lamp unit;

connecting means extending between said inner and outer movable frames through said central bores in said fixed mounting member for connecting said movable frames to each other; and means operatively connected to said movable inner frame for effecting movement of said outer movable frame and lamp unit upon actuation thereof.

9. A hand operated spotlight assembly adapted to be mounted on the roof of a vehicle for directing a light beam in a desired direction; said spotlight assembly comprising:

inner and outer fixed hemispherically shaped mounting members adapted to be secured to opposed sides of the roof and having a central bore therethrough;

a movable inner frame mounted on said inner fixed mounting member and a movable outer frame mounted on said outer fixed mounting member;

a lamp unit positioned adjacent said movable outer frame;

means mounting said lamp unit on said movable frame permitting said lamp unit to tilt in a generally vertical plane and to rotate about a longitudinal axis;

said movable inner and outer frames each including a concave member forming a socket fitting over and in contact relation with the associated fixed hemispherically shaped mounting member; and means connecting said inner and outer frames to each other including manually operable means for varying frictional contact between said movable concave members and said fixed associated hemispherically shaped mounting members, said manually operable means movable between a position permitting movement of said inner and outer frames relative to said fixed members and a position restricting movement between said movable frames and said fixed mounting members.

10. A spotlight assembly as set forth in claim 9 wherein a rod extends between and is connected to said movable frames; and a handle is secured to said inner movable frame for actuation of said movable frames and lamp unit.

11. A spotlight assembly as set forth in claim 10 wherein cam means is operatively connected to said rod to selectively tension said rod for urging said concave members of said movable frames into tight frictional contact with said hemispherically shaped fixed members to prevent movement of said movable frames relative to said fixed mounting members.

12. A spotlight assembly as set forth in claim 10 wherein said rod is externally splined and receiving means on said movable inner frame is internally splined to receive said rod in an interfitting telescoping relation.

13. A spotlight assembly as set forth in claim 11 wherein said handle includes a manually depressible link operatively connecting to said cam means for moving said cam means between a releasably locked position of the spotlight in which movement of the movable frames is prevented and an unlocked position of the spotlight in which movement of the movable frames and lamp unit is permitted.

14. A spotlight assembly adapted to be mounted on a support for directing a light beam in a desired direction; said spotlight assembly comprising:
   a pair of fixed mounting members secured to opposed sides of the support in opposed relation to each other to define inner and outer fixed mounting members with the support having an opening therethrough between the mounting members;
   a movable inner frame mounted on said inner fixed mounting member and having an actuating member thereon;
   a movable outer frame mounted on said outer fixed mounting member for relative tilting movement and for rotation;
   a lamp unit for said movable outer frame;
   means mounting said lamp unit on said movable outer frame for relative pivotal movement; and
   means extending between and connecting said inner and outer movable frames through said opening in said support and operatively connected to said actuating member for movement thereby.

15. A spotlight assembly adapted to be mounted on a support for directing a light beam in a desired direction; said spotlight assembly comprising:
   inner and outer hemispherically shaped mounting members adapted to be secured to opposed sides of the support and having a central bore therethrough;
   a movable inner frame mounted on said inner fixed mounting member and a movable outer frame mounted on said outer fixed mounting member;
   a lamp unit positioned adjacent said movable outer frame;
   linkage means between said lamp unit and said movable outer frame mounting said lamp unit for relative pivotal movement in a vertical plane and permitting said lamp unit to move in a vertical plane between a retracted low profile position closely adjacent said support with the light beam directly generally vertical upwardly to a projected position in which the light beam is directed in a generally horizontal direction;
   an actuating member operatively connected to said movable inner frame; and
   connecting means extending between said inner and outer movable frames through said central bores in said mounting members to effect a predetermined movement of said outer movable frame and lamp unit upon a predetermined actuation of said actuating member.

16. A spotlight assembly adapted to be mounted on a support for directing a light beam in a desired direction comprising:
   a fixed mounting member secured to said support;
   a movable outer frame mounted on said fixed mounting member for relative tilting movement and for rotation;
   a lamp unit for said movable outer frame;
   linkage means between said lamp unit and said movable outer frame mounting said lamp unit for relative pivotal movement and permitting said lamp unit to move in a predetermined plane between a retracted low profile position and a projected position; and
   actuating means connected to said movable outer frame to effect a predetermined movement of said outer movable frame and lamp unit upon a predetermined actuation of said actuating means.

17. A spotlight assembly as set forth in claim 16 wherein said linkage means comprises a pair of spaced links pivotally connected to said lamp unit about a pair of spaced pivot axes, said links providing a mechanical advantage between said lamp unit and said actuating means for tilting of said lamp unit.

18. A spotlight assembly as set forth in claim 17 wherein said lamp unit includes a pair of spaced bulbs and a reflector; and means mounting said bulbs for movement toward and away from said reflector.

19. A method of installing a hand operated spotlight assembly on the roof of a vehicle comprising the following steps:
   providing an opening in said roof;
   securing a pair of hemispherically shaped members over said opening on opposite side of said roof to provide fixed inner and outer mounting members;
   providing an outer movable subassembly for said fixed outer mounting member including a movable outer frame, a lamp unit on the movable outer frame, and a connecting shaft extending from said movable outer frame;
   mounting said outer movable subassembly on said fixed outer mounting member with said shaft extending through said opening;
   providing an inner movable subassembly for said fixed inner mounting member having a movable inner frame including a manually actuated handle, and a receiver for receiving said shaft in a telescoping relation;
   positioning said inner movable subassembly on said fixed inner mounting member with said shaft being received within said receiver in interfitting telescoping relation for rotation therewith; and
   securing said shaft to said inner movable subassembly with said manually actuated handle effecting rotation and tilting of said lamp unit upon predetermined movement of said handle.

20. The method as set forth in claim 19 including the step of mounting said lamp unit on said movable outer frame for relative pivotal movement about a generally horizontal axis.

21. The method as set forth in claim 20 including the step of mounting said lamp unit on said movable outer frame for pivotal movement about a pair of spaced horizontal axes for providing a mechanical advantage between said handle and said lamp unit to permit an increased tilting movement of said lamp unit from a lesser movement of said handle.

22. A hand operated spotlight assembly adapted to be mounted on the roof of a vehicle for directing a light beam in a desired direction; said spotlight assembly comprising:

a pair of fixed mounting members secured to opposed sides of the roof in opposed relation to each other to define inner and outer fixed mounting members with the roof having an opening therethrough between the mounting members;

a movable inner frame mounted on said inner fixed mounting member and having a manually actuated handle thereon;

a movable outer frame mounted on said outer fixed mounting member for relative tilting movement and for rotation;

a lamp unit for said movable outer frame;

means mounting said lamp unit on said movable outer frame for relative pivotal movement including a link pivotally connected at one end about a horizontal axis to said lamp unit and pivotally connected at an opposite end to said movable outer frame; and means extending between and connecting said inner and outer movable frames through said opening in said roof and operatively connected to said handle for movement thereof.

23. A hand operated spotlight assembly adapted to be mounted on the roof of a vehicle for directing a light beam in a desired direction; said spotlight assembly comprising:

a pair of fixed mounting members secured to opposed sides of the roof in opposed relation to each other to define inner and outer fixed mounting members with the roof having an opening therethrough between the mounting members, said fixed mounting members being of a hemispherical shape and having a central bore therein in axial alignment with said hole in said roof;

a movable inner frame mounted on said inner fixed mounting member and having a manually actuated handle thereon;

a movable outer frame mounted on said outer fixed mounting member for relative tilting movement and for rotation;

a lamp unit for said movable outer frame;

a sleeve mounted within said central bore of said outer fixed mounting member for relative rotative movement;

a pair of fasteners mounted on said sleeve and extending outwardly therefrom;

means extending between said fasteners and said lamp unit mounting said lamp unit on said movable outer frame for relative pivotal movement about a horizontal axis; and means extending between and connecting said inner and outer movable frames through said opening in said roof and operatively connected to said handle for movement thereof.

24. A hand operated spotlight assembly as set forth in claim 22 wherein means extend between said movable outer frame and said lamp unit pivotally mounting said lamp unit about a second horizontal axis spaced horizontally from said first mentioned horizontal axis and movable with said movable outer frame when tilted in a vertical plane.

25. A hand operated spotlight assembly as set forth in claim 24 wherein means restrict movement of said opposite end of said link upon tilting movement of said movable outer frame in a vertical plane.

26. A hand operated spotlight as set forth in claim 23 wherein said pair of fasteners are electrical conductors to supply electrical energy to said lamp unit.

27. A hand operated spotlight as set forth in claim 23 wherein said movable outer frame has elongate slots receiving said fasteners to permit tilting movement of said movable outer frame relative to said lamp unit.

28. A hand operated spotlight as set forth in claim 23 wherein a rod extends within said central bores of said fixed mounting members and connects said handle to said movable outer frame for effecting tilting and rotative movements of said lamp unit upon selective manual actuation of said handle.

* * * * *